UNITED STATES PATENT OFFICE.

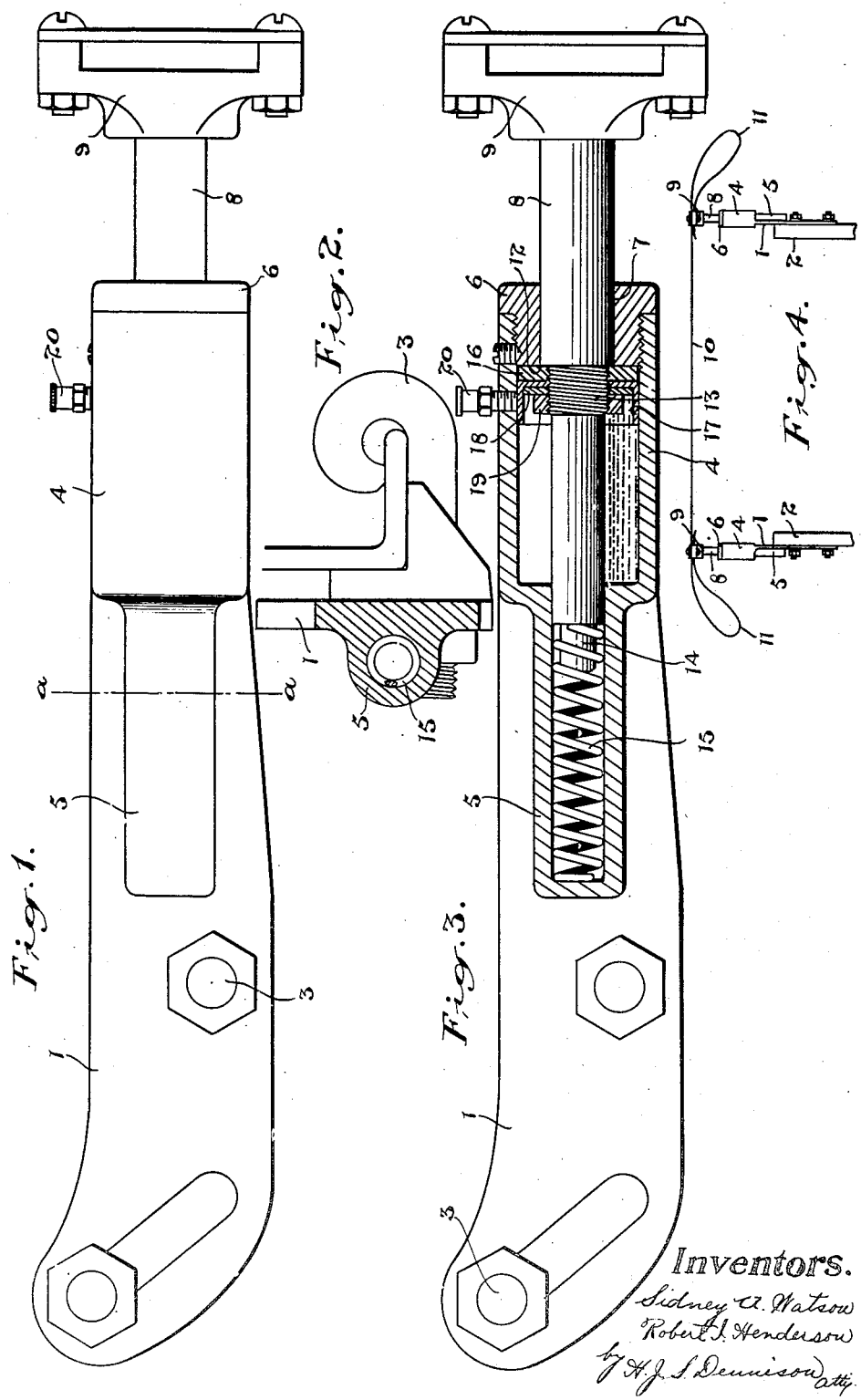

SIDNEY A. WATSON AND ROBERT I. HENDERSON, OF TORONTO, ONTARIO, CANADA.

AUTOMOBILE-BUMPER.

1,325,342.  Specification of Letters Patent.  Patented Dec. 16, 1919.

Application filed October 16, 1919. Serial No. 330,980.

*To all whom it may concern:*

Be it known that we, SIDNEY A. WATSON and ROBERT IRWIN HENDERSON, both subjects of the King of Great Britain, and residents of the city of Toronto, county of York, Province of Ontario, in the Dominion of Canada, have invented certain new and useful Improvements in Automobile-Bumpers, described in the following specification and illustrated in the accompanying drawings, that form part of the same.

The principal objects of this invention are, to effectively protect motor cars from damage through minor end-on collisions and to avoid damaging other cars through such collisions, and to devise a simple and effective form of bumper which will utilize the elasticity of air as a cushion to relieve the shock.

The principal feature of the invention consists in the novel construction and arrangement of parts whereby the bar portion of the bumper is carried upon rods slidably arranged within cylinders and the inward movement of said rods is cushioned by the compression of air within said cylinders by pistons carried by the rods and whereby the bumper rods are returned to their normal positions by coil spring members.

In the drawings, Figure 1 is a side elevational view of our improved bumper cushion.

Fig. 2 is a cross sectional view through the line *a—a*.

Fig. 3 is an elevational view in part longitudinal section through the center line of the cylinders.

Fig. 4 is a plan view showing the bumper cushions and bar on a reduced scale.

Many forms of bumpers have been devised for use on motor cars and many of these have supporting arms adapted to recede against a spring pressure but such springs in order to be effective in protecting the car require to be extremely heavy and the action of such bumpers in coming in contact with an object such as another car are very liable to cause damage to such car because of their rigidity.

It is desirable to provide a means for relieving the shock of minor collisions such as occur very frequently in the driving of motor cars where in close traffic one car is liable to bump into another and this invention has been devised in order to provide an effective bumper which will relieve the shock of contact and will not be liable to injure the car which is struck.

In the improved structure the bumper bar supports are each formed of a flat bar member 1 which is adapted to lie flat against the outer face of the web of the horn 2 of the car frame, being secured thereto by suitable hook bolts 3 which grip the flange of the frame.

The bar 1 is formed of cast metal having molded on one side thereof the cylinder 4 at the extremity and the smaller cylinder 5 which connects with the closed end of the cylinder 4.

A cap 6 is threaded, or otherwise secured in the outer end of the cylinder 4 and is formed with a central hole 7 through which the bumper rods 8 extend. The outer end of each bumper rod is provided with a suitable clip 9 which embraces the bumper bar 10 which may be of any desirable form but is here shown of a length of flat spring metal having looped ends 11 extending beyond the clips.

Each bar 10 slides in the cap 6 and is formed with a shoulder 12 and a threaded portion 13 and the portion beyond the thread is slightly reduced and extends in sliding contact into the outward end of the bore of the cylinder 5. The extremity 14 is further reduced to enter the end of a coiled compression spring 15 inclosed within the cylinder 5.

A washer 16 abuts the shoulder 12 of the bumper bar and a cupped leather washer 17 is held thereagainst by the washer 18 and nut 19 secured on the threaded portion 13 of the bar.

The piston formed by the washer 16 is adapted, upon pressure being exerted against the bumper rod to compress the air within the cylinder 4 and as it moves inwardly the resisting pressure increases as the air is confined and cannot escape. The compression spring 15 does not present any material resistance to the inward movement of the bumper rod, it being merely intended to return the rod to its outward position, but a very material element in the successful use of the device consists in the use of a quantity of oil which is inclosed within the cylinders.

The oil maintains the cupped washer soft and pliable so that it acts instantly in compressing the air and as the pressure increases the oil offers a material yielding resistance to the inward movement of the bumper rod as it is forced out of the cylinder 5 and it then cushions the piston at the bottom of its stroke.

When the pressure against the rod is released the coil spring forces it outwardly and the oil is sucked back into the cylinder 5.

A suitable oil cap 20 is provided adjacent to the outer end of the cylinder 4 through which oil may be inserted to replenish the supply but this opening will not allow the escape of air as it is arranged to the outward side of the piston.

The construction herein described is found to be very efficient, it is very compact, simple to construct and is very neat in appearance.

What we claim as our invention is:—

1. In a bumper for automobiles, the combination with a bumper bar, of pistons secured to said bar, and sealed cylinders inclosing said pistons and secured to the car.

2. In an automobile bumper, a bracket having a sealed cylinder formed with a reduced inner end, a bumper rod sliding in said cylinder having the inner end entering the reduced cylinder end, a piston secured to said bumper rod, and spring means for returning the bumper rod to the outward position.

3. In an automobile bumper, a bracket having a sealed cylinder formed with a reduced inner end, a bumper rod entering the larger end of the cylinder and having the inner end slidably engaging the reduced portion of said cylinder, a piston secured to said rod within the larger end of the cylinder, and a fluid cushion arranged within the cylinder.

4. In an automobile bumper, a bracket having a sealed cylinder formed with a reduced inner end, a bumper rod entering the larger end of the cylinder and having the inner end slidably engaging the reduced portion of said cylinder, a piston secured to said rod within the larger end of the cylinder, a coil compression spring inclosed within the reduced end of said cylinder and abutting the bumper rod, and an oil cushion arranged in said cylinder.

5. In an automobile bumper, a bracket having a sealed cylinder formed with a reduced inner end, a bumper rod entering the larger end of the cylinder and having the inner end slidably engaging the reduced portion of said cylinder, a piston secured to said rod within the larger end of the cylinder, a fluid cushion arranged within the cylinder, and an oil hole arranged close to the outer end of the cylinder at a point beyond the outward travel of the piston.

6. In an automobile bumper, a bracket formed of a flat metal bar having a double cylinder arranged on one side thereof, a bumper rod extending through the outer cylinder and into the inner one, a piston secured to said rod within the outer cylinder, and means for sealing the outer end of the cylinder.

SIDNEY A. WATSON.
ROBERT I. HENDERSON.